United States Patent [19]

Dassero

[11] Patent Number: 5,049,914
[45] Date of Patent: Sep. 17, 1991

[54] CASSETTE EJECTING APPARATUS

[75] Inventor: William F. Dassero, Rochester, N.Y.
[73] Assignee: Eastman Kodak Company, Rochester, N.Y.
[21] Appl. No.: 543,923
[22] Filed: Jun. 26, 1990
[51] Int. Cl.$^5$ .............................................. G03B 17/02
[52] U.S. Cl. ................................................... 354/288
[58] Field of Search .............. 354/174, 275, 202, 210, 354/21, 288

[56] References Cited

U.S. PATENT DOCUMENTS

| | | | |
|---|---|---|---|
| 2,548,549 | 4/1951 | Mihalyi | 354/288 |
| 3,380,362 | 4/1968 | Winkler et al. | 384/288 |
| 3,543,664 | 12/1970 | Kremp et al. | 354/288 |
| 3,672,279 | 6/1972 | Hackenberg et al. | 354/288 |
| 4,095,249 | 6/1978 | Miura | 354/288 |
| 4,240,734 | 12/1980 | Nomura et al. | 354/173 |
| 4,330,190 | 5/1982 | Chan | 354/275 |

FOREIGN PATENT DOCUMENTS 57-25214 1/1957 Japan .
8271 2/1990 Japan .

*Primary Examiner*—L. T. Hix
*Assistant Examiner*—David M. Gray
*Attorney, Agent, or Firm*—Roger A. Fields

[57] ABSTRACT

In a photographic camera which includes a chamber for receiving endwise, i.e. axially, a film cassette capable of automatically thrusting a non-protruding film leader to the exterior of the cassette shell responsive to unwinding rotation of a film spool within the shell, an ejecting member pops the film cassette at least part way out of the chamber end first when a cover door for the chamber is manually opened.

1 Claim, 13 Drawing Sheets

CASSETTE EJECTING APPARATUS

CROSS-REFERENCE TO A RELATED APPLICATION

Reference is made to commonly assigned copending application Ser. No. 07/506,320 entitled FILM CASSETTE, and filed Apr. 9, 1990 in the name of John J. Niedospial.

BACKGROUND OF THE INVENTION

1. Field of the Invention

The invention relates generally to the field of photography, and in particular to apparatus for ejecting a film cassette at least part way out of a cassette receiving chamber in the body of a camera.

2. Description of the Prior Art

Commonly assigned U.S. Pat. No. 4,841,319 issued June 20, 1989 discloses a photographic camera which includes a compartment having a cassette receiving chamber. The compartment is movable outwardly from the camera body to insert a type of 35 mm film cassette that contains a non-protruding film leader endwise, i.e. axially, into the chamber. A loading opening to the chamber has a continuous enclosed perimeter commensurate in shape with an outline of the aforementioned film cassette. This feature prevents a type of film cassette that has a protruding film leader from being inserted endwise into the chamber, by obstructing the protruding film leader edgewise.

3. The Cross-Referenced Application

Like the type of film cassette disclosed in U.S. Pat. No. 4,841,319, the cross-referenced application discloses a film cassette that contains a non-protruding film leader The film leader can be automatically advanced to the exterior of the cassette shell in response to unwinding rotation of a film spool within the shell.

SUMMARY OF THE INVENTION

According to the invention, there is provided an improved photographic camera wherein (a) a film cassette receiving chamber is configured to only receive a type of film cassette that contains a non-protruding film leader and (b) manually operable means can be operated alternatively to expose the chamber and to conceal the chamber, and wherein the improvement comprises:

cassette ejecting means actuatable for ejecting at least part way from the chamber the type of film cassette that contains a non-protruding film leader; and coupling means interconnecting the manually operable means and the cassette ejecting means for actuating the cassette ejecting means responsive to operating the manually operable means to expose the chamber.

More specifically, there is provided in a photographic camera which includes a chamber for receiving endwise, i.e. axially, a film cassette capable of automatically thrusting a non-protruding film leader to the exterior of the cassette shell responsive to unwinding rotation of a film spool within the shell, an ejecting member which pops the film cassette at least part way out of the chamber end first when a cover door for the chamber is manually opened.

DETAILED DESCRIPTION OF THE PREFERRED EMBODIMENT

The invention is disclosed as being embodied preferably in a 35 mm still-picture camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
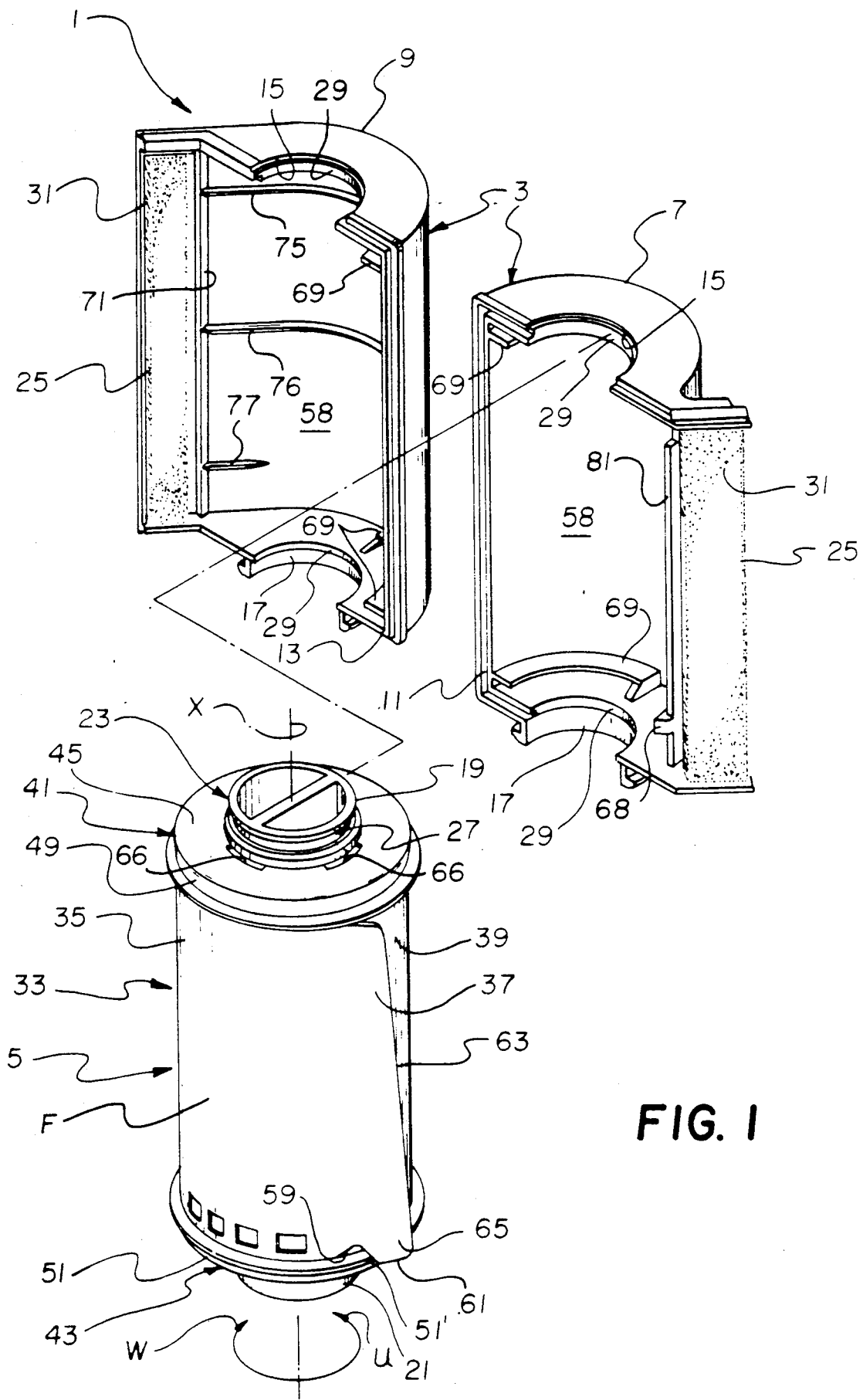
FIG. 1 is an exploded perspective view of a film cassette similar to the one disclosed in the application cross-referenced above.
Figure 2:
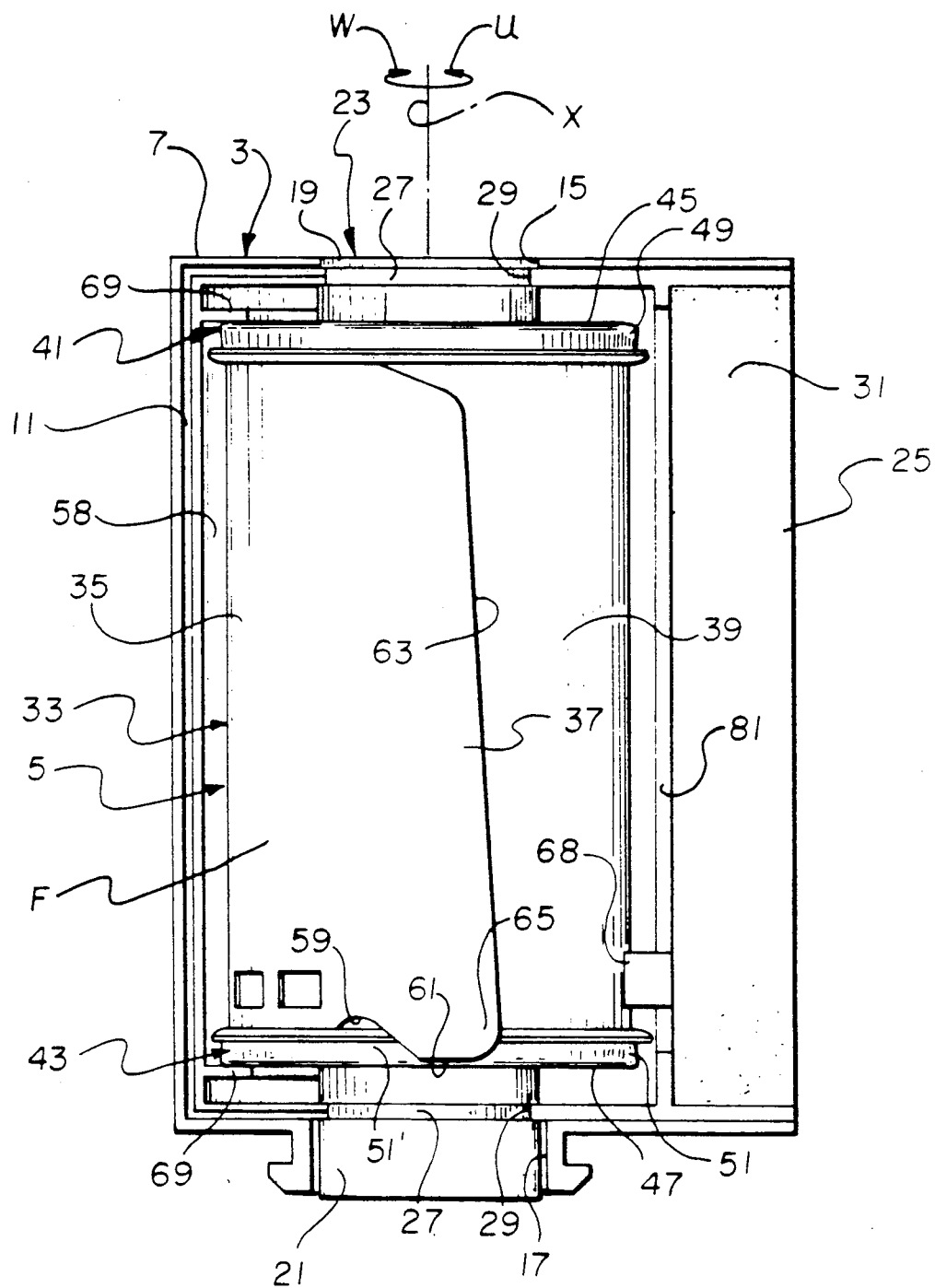
FIG. 2 is an elevation view of the film cassette, illustrating the cassette shell open to reveal a film roll coiled about a film spool.
Figure 12:
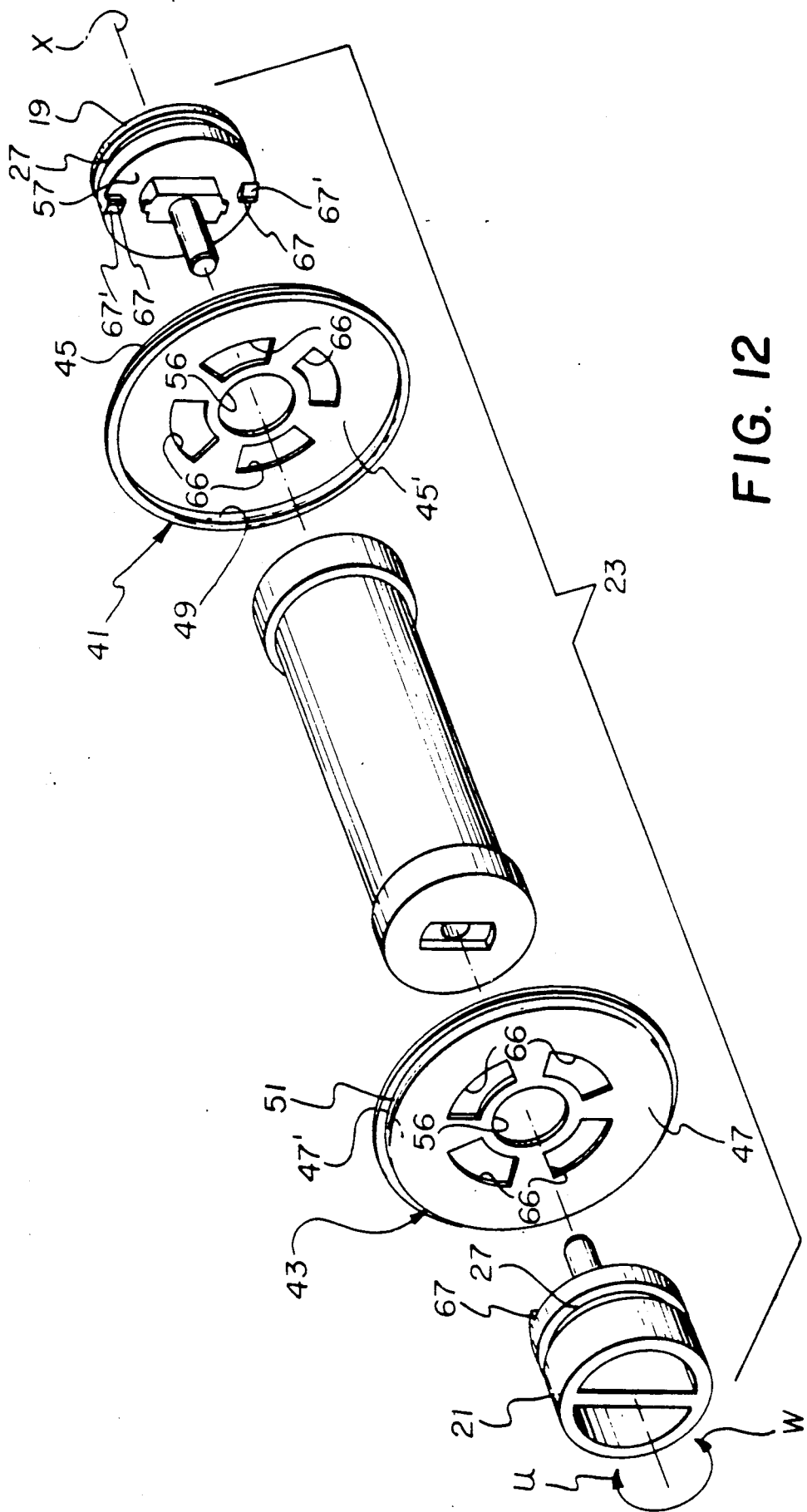
FIG. 12 is an exploded perspective view of the film spool without the film roll.
Figure 13:
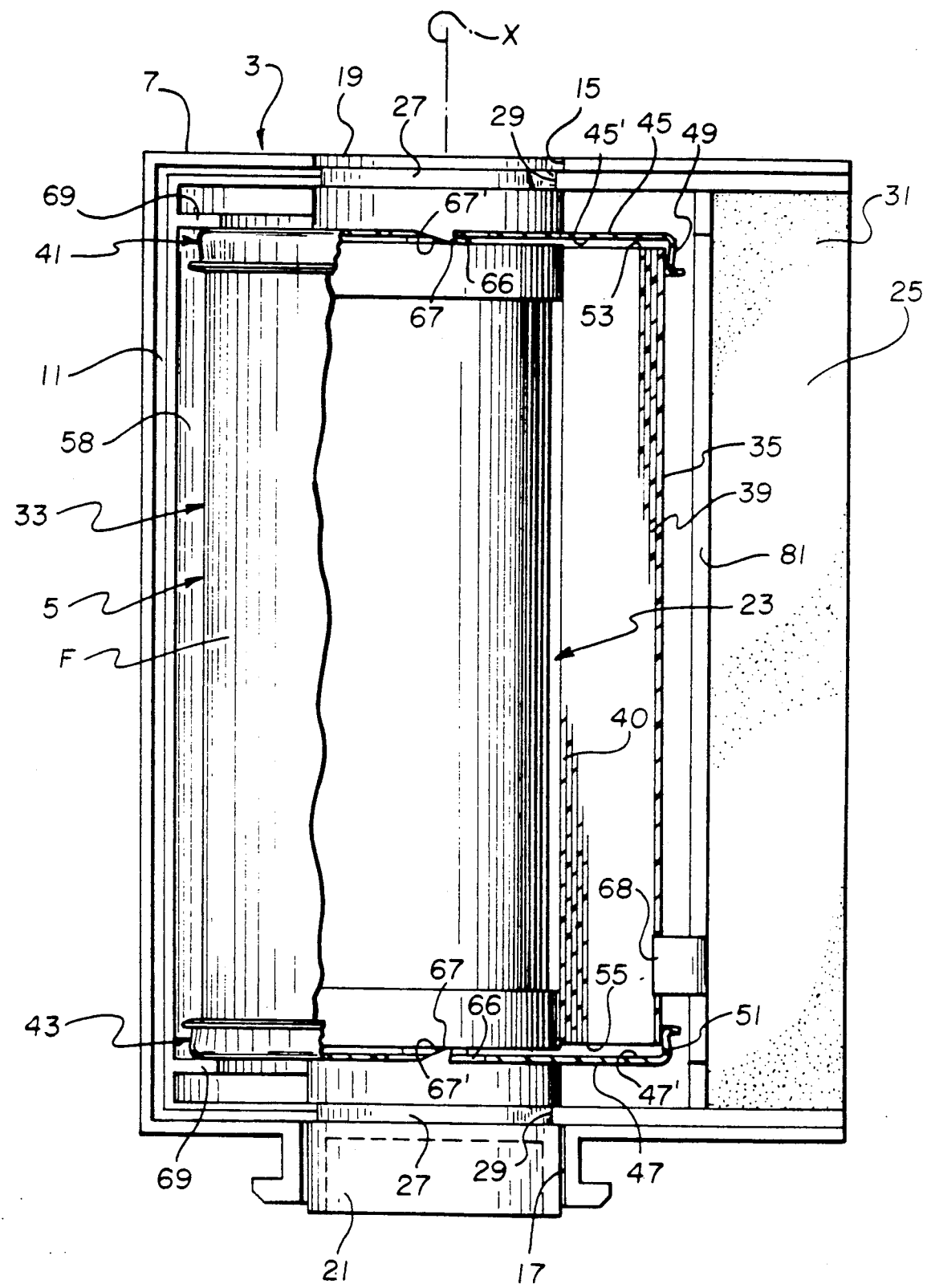
FIG. 13 is an elevation view partly in section of the film roll and the film spool, illustrating the manner in which one of a pair of film confining flanges of the spool may be fixed to the spool for concurrent rotation with the spool.

Referring now to the drawings, FIGS. 1, 2 and 12 depict a 35 mm film cassette 1 substantially as disclosed in the application cross-referenced above. The film cassette 1 comprises a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
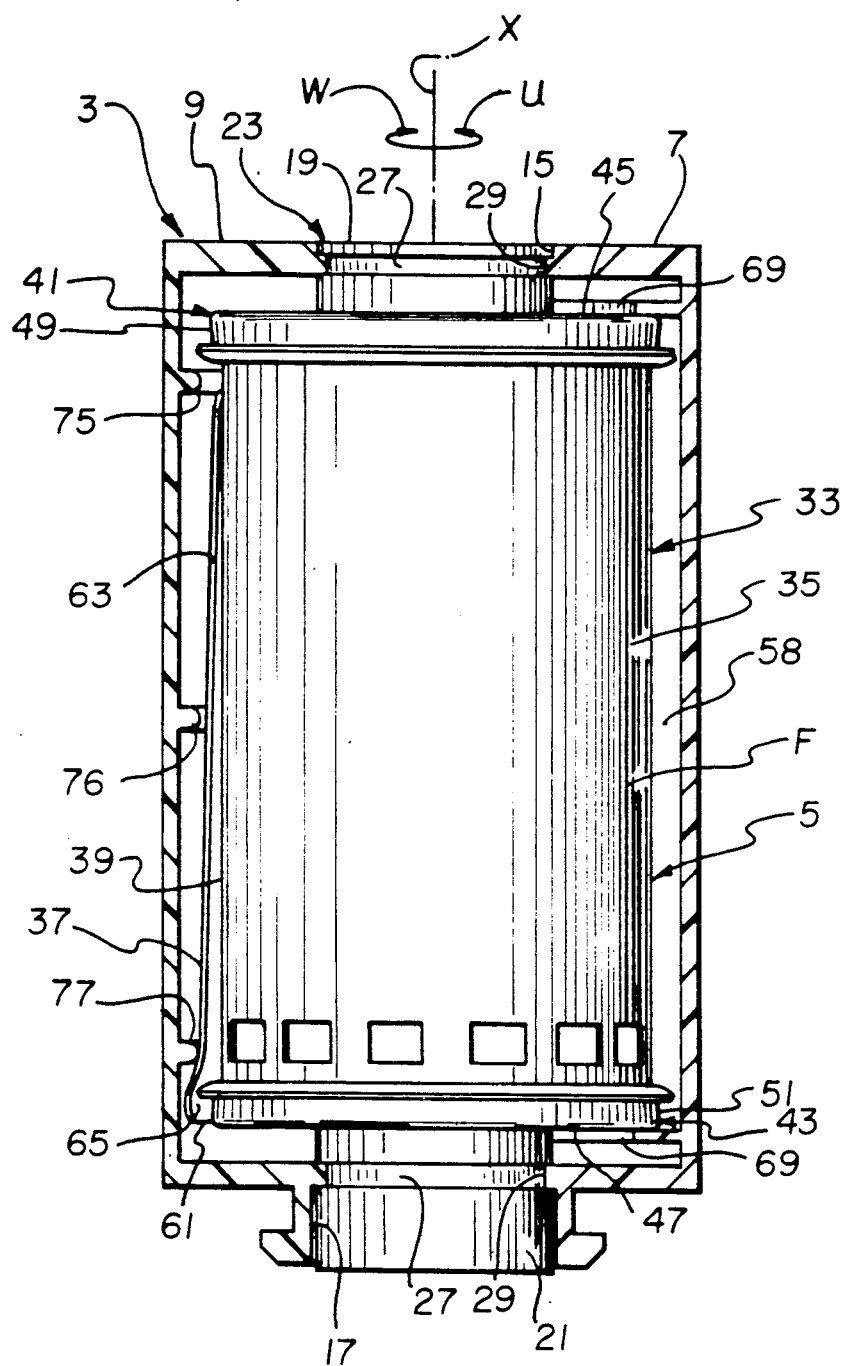
FIG. 3 is an elevation view similar to FIG. 2, through in section.
Figure 9:
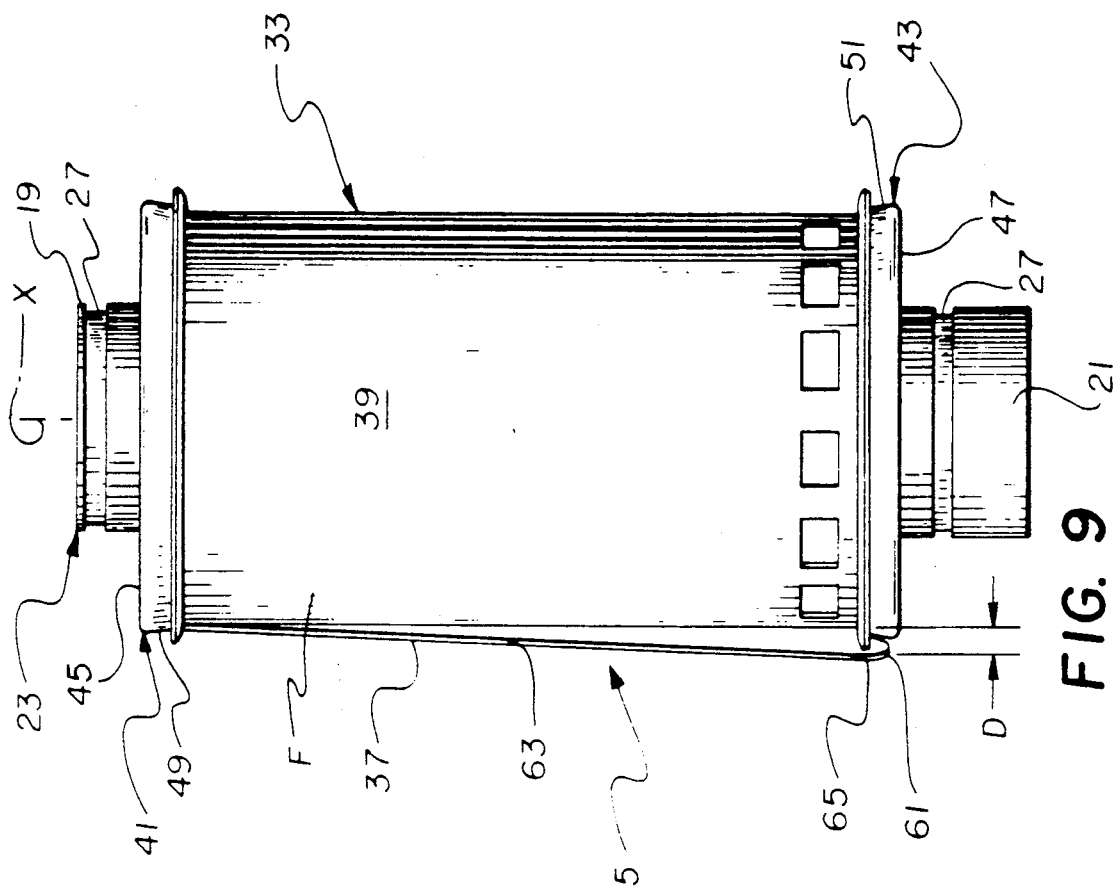
FIGS. 8 and 9 are elevation views of the film roll and the film spool, illustrating the manner in which the film roll is originally stored on the film spool.
Figure 8:
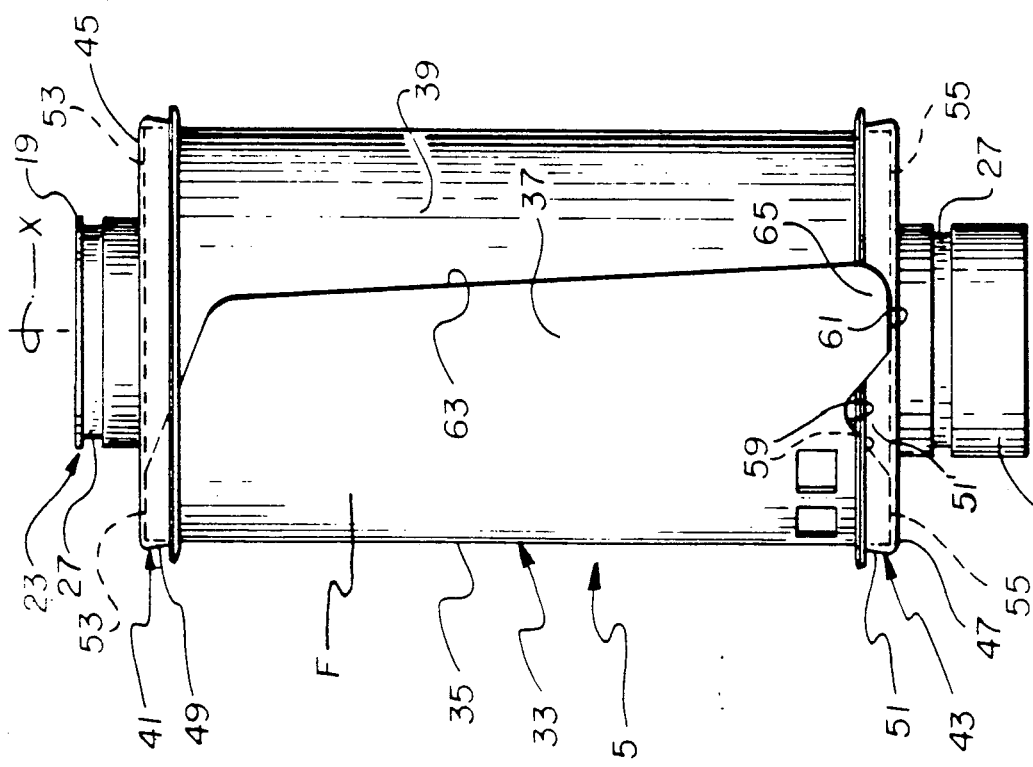

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13. A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential recesses 57 are provided in the spool core 23 for supporting the flanges 41 and 43 at their disks 45 and 47 to permit the flanges to be independently rotated about the axis X. The two recesses 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
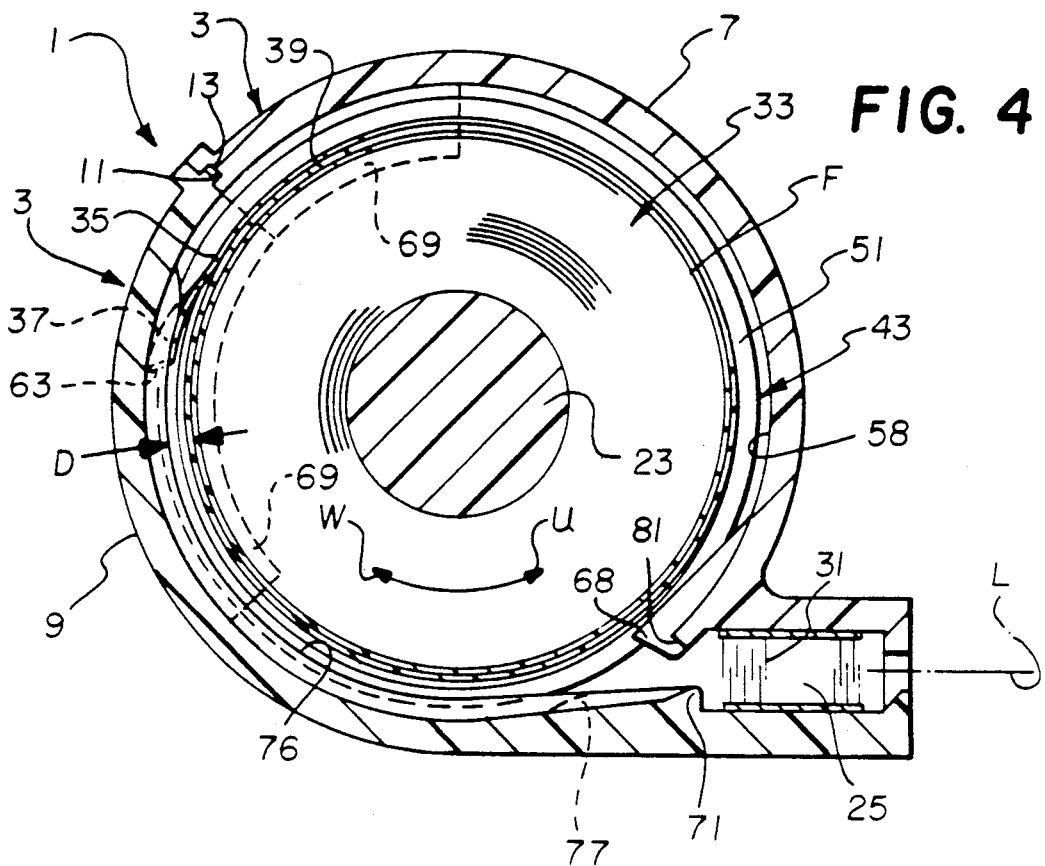
FIG. 4 is an end view partly in section of the cassette shell, the film roll and the film spool, illustrating the manner in which the film roll is originally stored on the film spool.
Figure 5:
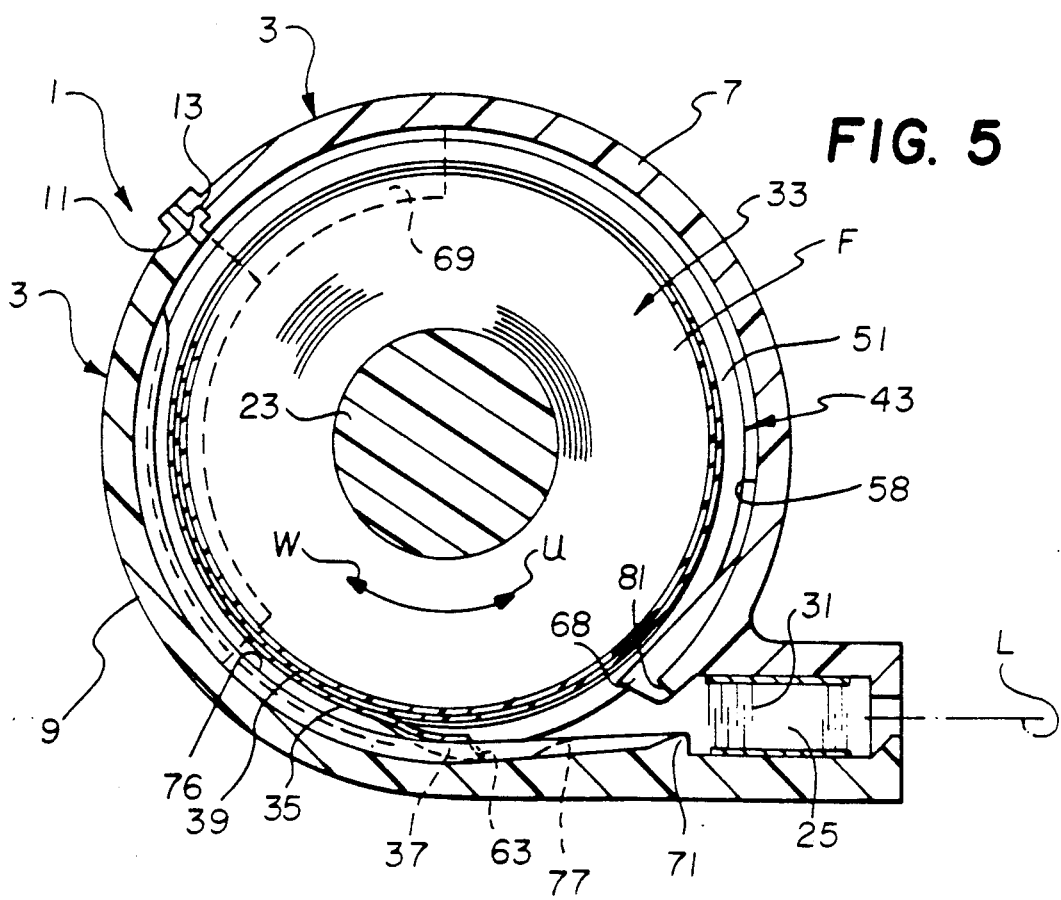
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
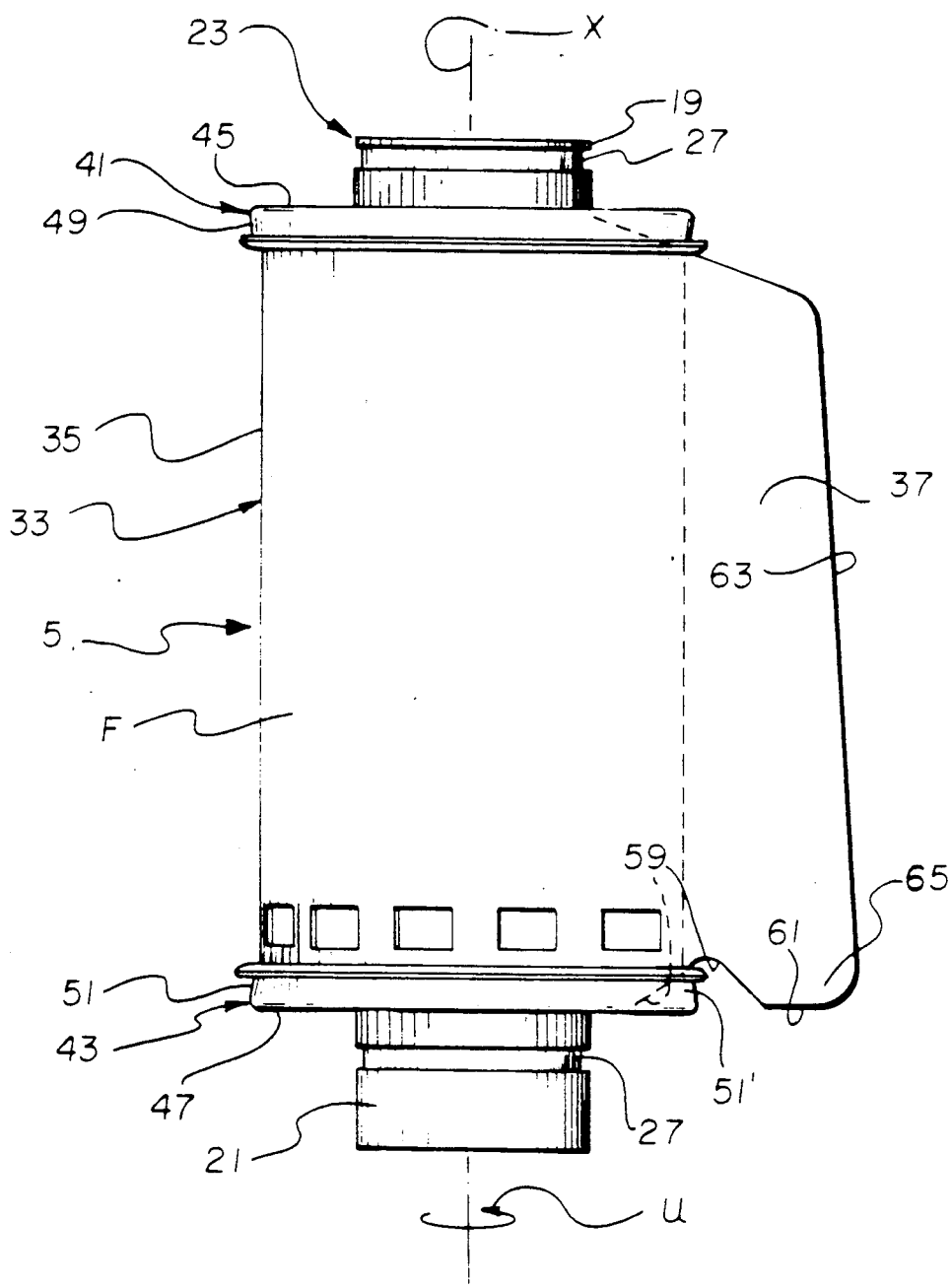
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"–0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

Operation of the Film Cassettes

Figure 6:
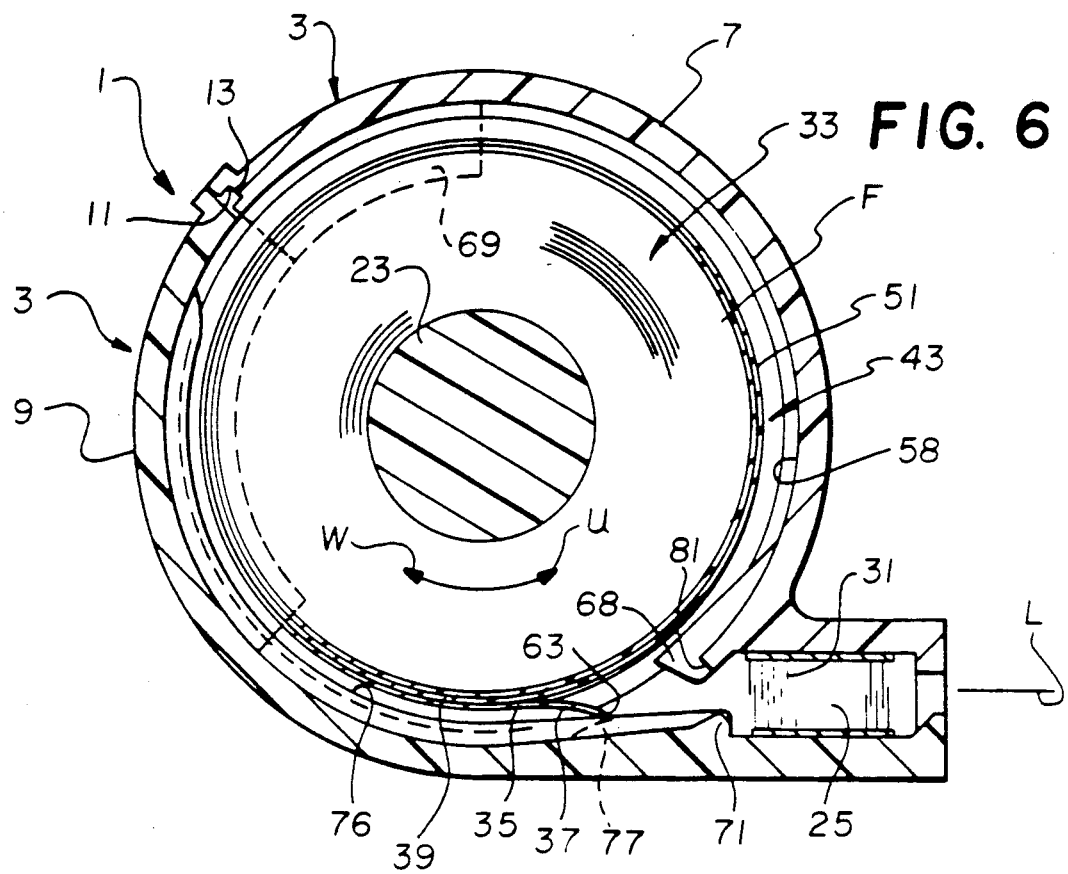
Figure 7:
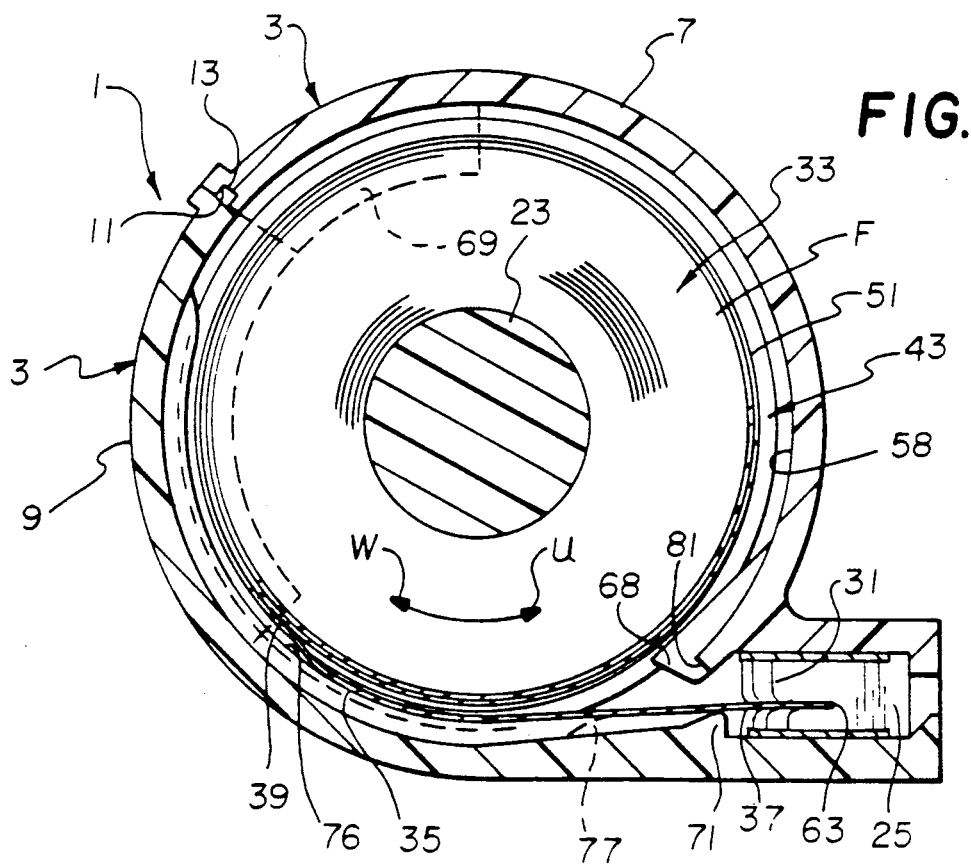
Figure 11:
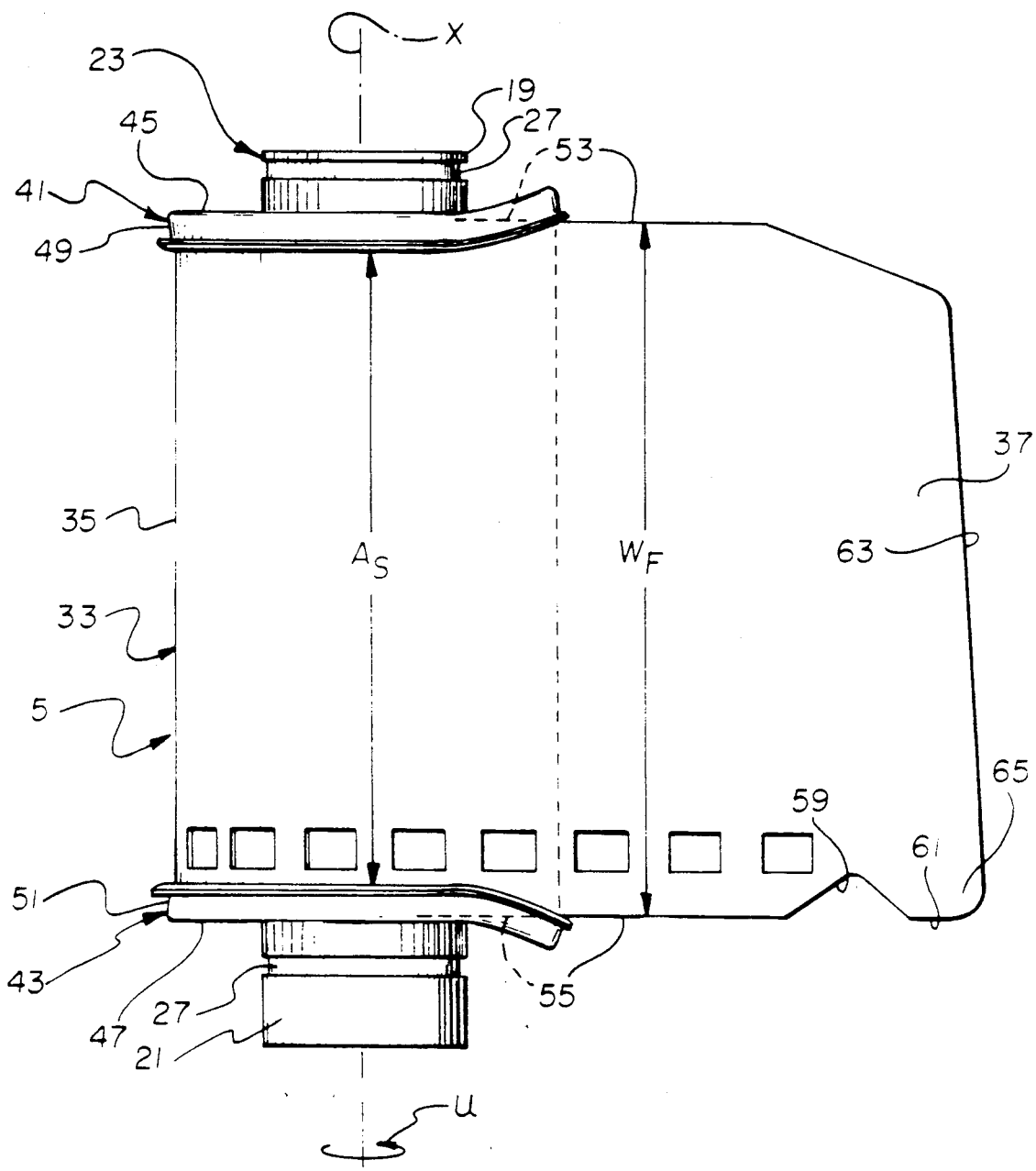

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43. The spool core 23 is rotated in the winding direction W substantially until the slot 75 in the film leader 35 receives the free end 79 of the tooth 77 to thus engage the film leader to the tooth.

It has been found that by fixing at least one of the two flanges 41 and 43 to the spool core 23 during unwinding rotation of the film spool 5, as contrasted with allowing the flange to remain rotatable independently of the spool core, there is immediately effected a frictional relationship between the film leader 35 and the skirted periphery of the flange which improves the ability of the film spool to thrust the film leader through the light-tight passageway 25 to the exterior of the cassette shell 3. In particular, the frictional relationship increases the pushing force the spool core 23 will apply to the film leader 35 to propel the leader out of the cassette shell 3. Moreover, it has been found that by allowing both of the flanges 41 and 43 to be rotated independently of the spool core 23 during winding rotation of the film spool 5, it is substantially ensured that the leader can be rewound within the skirted peripheries 49 and 51 of the flanges without being obstructed by the skirted peripheries.

The Photographic Camera

Figure 14:
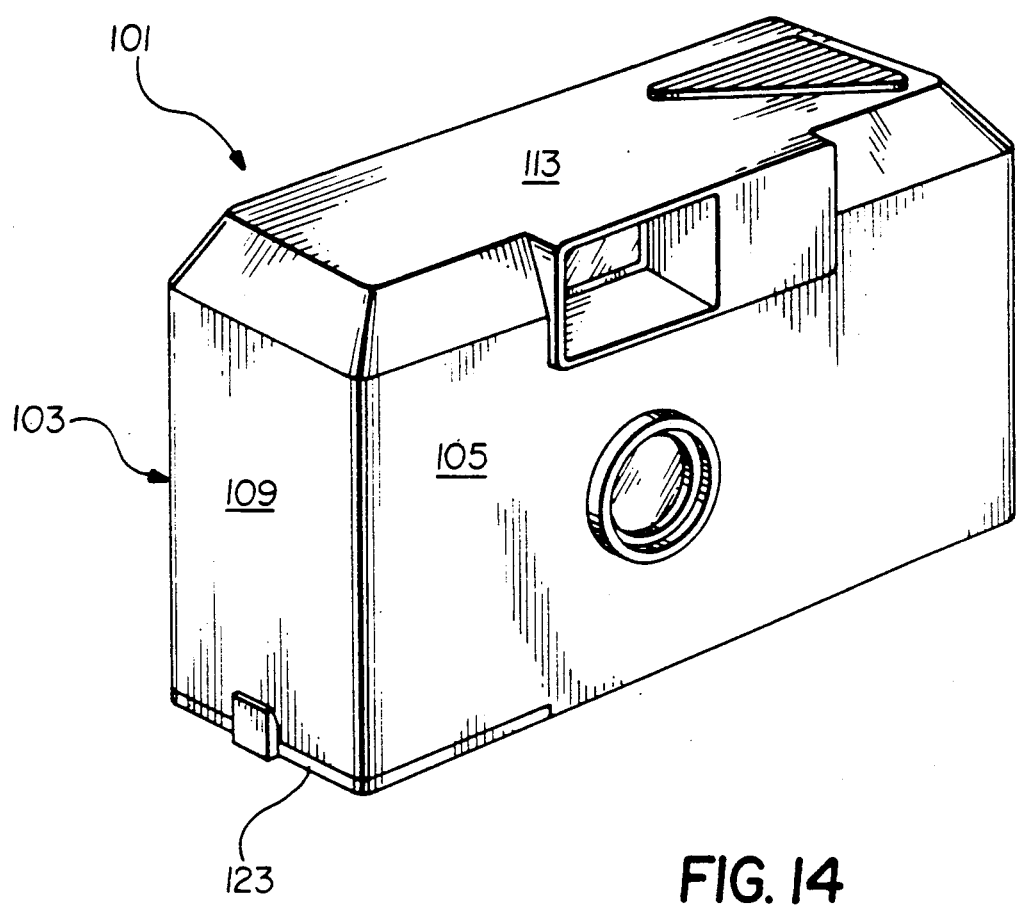
FIG. 14 is a top front perspective view of an improved photographic camera including cassette ejecting apparatus according to a preferred embodiment of the invention.
Figure 15:
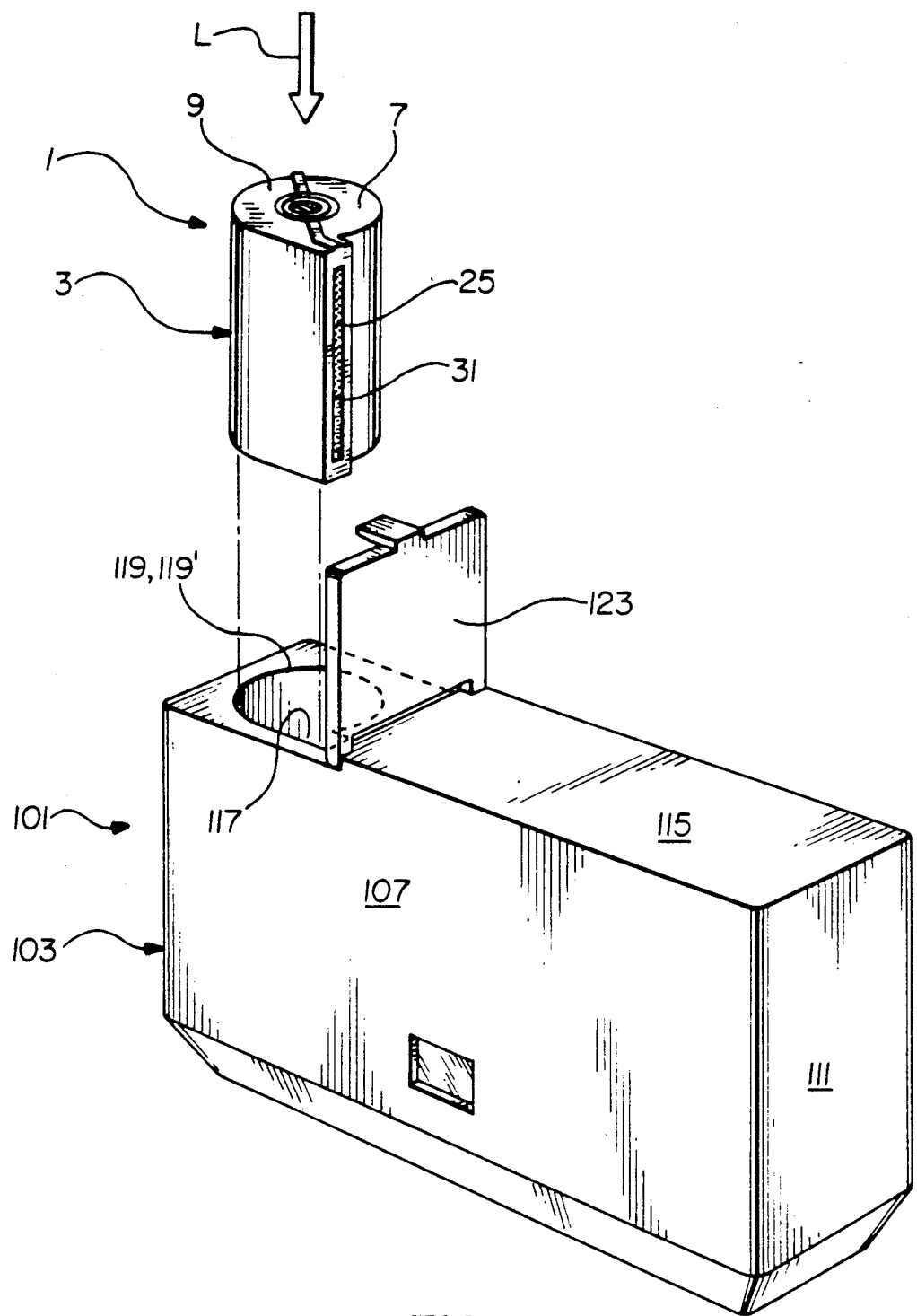
FIG. 15 is a bottom rear perspective view of the camera.

Referring now to FIGS. 14–18, an improved photographic camera 101 is depicted for use with the film cassette 1. The camera body 103 as shown in FIGS. 14 and 15 has relatively large front and rear faces 105 and 107, a pair of smaller opposite end faces 109 and 111, and a pair top and bottom faces 113 and 115.

A cassette receiving chamber 117 for receiving the film cartridge 1 endwise, i.e. axially, in the direction L is formed within the interior of the camera body 103. The cassette receiving chamber 117 is similar in shape to the one shown in commonly assigned U.S. Pat. No. 4,041,319, and it includes a loading opening 119 at the bottom face 115 of the camera body 103 which has a continuous enclosed perimeter 119' substantially commensurate in shape with an outline of the film cassette 1. See FIG. 15. As a result, only a 35 mm film cassette which contains a non-protruding film leader can be inserted into the chamber 117. A conventional 35 mm film cassette, which is a type having a protruding film leader, cannot be inserted into the chamber 117 because the bottom face 115 of the camera body 103 will obstruct the protruding film leader edgewise.

Figure 18:
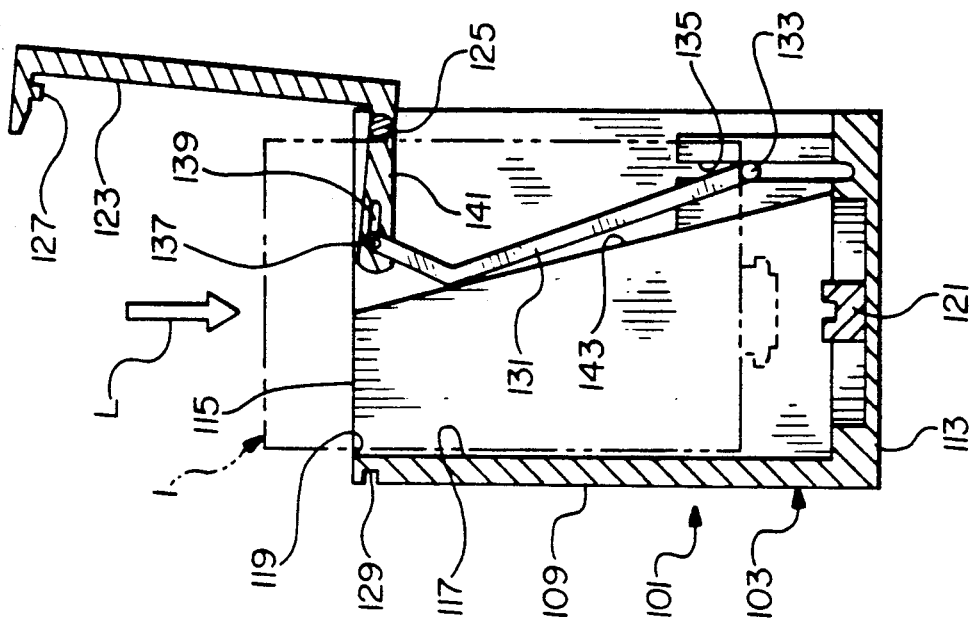
FIGS. 16, 17, and 18 are elevational views partly in section of the cassette ejecting apparatus, depicting successive stages of its operation.
Figure 17:
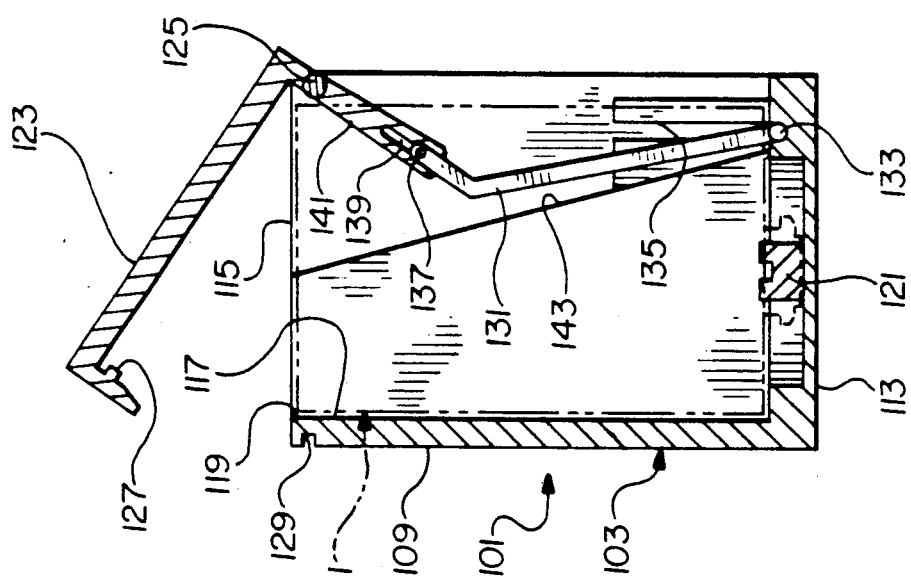
Figure 16:
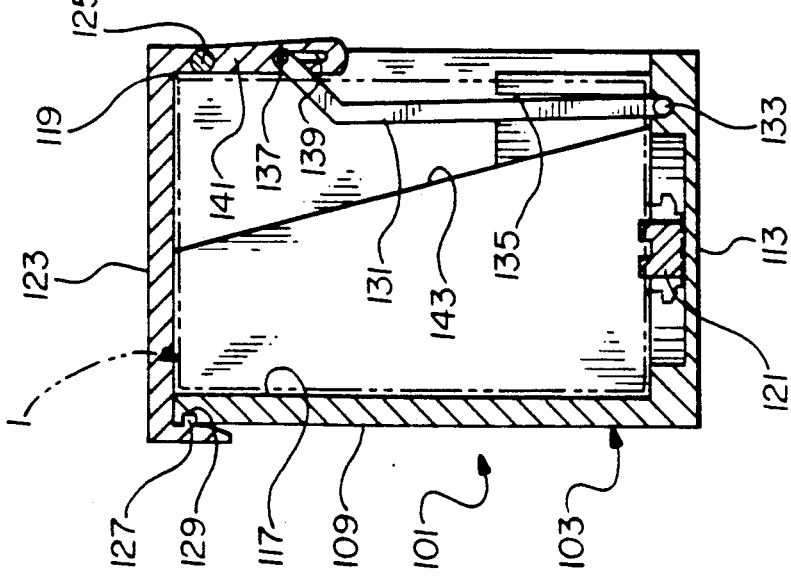

As shown in FIGS. 16–18, a conventional rotation shaft 121 protrudes slightly into the cassette receiving chamber to engage the spool core 23 in a known manner in order to rotate the film spool 5 of the film cassette 1 in the unwinding direction U to thrust the leading end 37 of the film leader 35 to the exterior of the cassette shell 3. Typical drive means, not shown, for rotating the shaft 121 may comprise an endless belt which extends in driving relation about a pulley. The pulley includes an inclined annular array of gear teeth adapted to mesh with a similar array of gear teeth formed on an idler wheel. The idler wheel engages the shaft 121 to rotate the shaft, but it permits the shaft to be moved axially by a helical compression spring in order to ensure that the shaft engages the spool core 23. Another known drive means for rotating the shaft 121 is illustrated in U.S. Pat. No. 4,363,547, issued Dec. 14, 1982.

A cover door 123 normally covering the loading opening 119 of the chamber 117 is supported via a pivot pin 125 to be manually swung open to uncover the loading opening. See FIGS. 15-18. A releasable latching pin 127 integrally molded with the cover door 123 is adapted to enter a matching cavity 129 in the end face 109 of the camera body 3 to secure the cover door closed. The cover door 123 is resiliently flexible in the vicinity of the latching pin 127 in order to manually remove the pin from the matching cavity 129 to permit the door to be opened.

A linking rod 131 interconnects a cassette ejecting pin 133 and the cover door 123 to move the ejecting pin to push the film cassette 1 in a direction opposite to the direction L part way through the loading opening 119 of the chamber 117 only after the cover door is partially opened. See FIGS. 16-18. The ejecting pin 133 is constrained for bi-directional movement in the direction L and the opposite direction within a guide slot 135. Overcentering means comprising an engaged stud 137 of the linking rod 131 and a slot 139 cut in an arm-like extension 141 of the door 123 operate to automatically open the door further once it is partially opened approximately 30°. When the door 123 is opened, the stud 137 is displaced from one end of the slot 139 to a center position in the slot. Once the stud 137 is shifted immediately beyond the center position, it will tend to gravitate to the other end of the slot 139 to thereby further open the door 123 automatically. An inclined edge 143 in the chamber 117 serves as a stop for the linking rod 131. See FIG. 18.

The invention has been described with reference to a preferred embodiment. However, it will be appreciated that variations and modifications can be effected within the ordinary skill in the art without departing from the scope of the invention.

I claim:

1. A photographic camera comprising a chamber for receiving a film cassette, a door normally covering said chamber and opened manually to uncover the chamber, and ejecting means connected to said door for pushing a film cassette at least part way out of said chamber when said door is opened, is characterized in that:

said ejecting means includes overcentering means initially moved to slightly beyond a centered position without moving a film cassette in said chamber in response to opening said door manually a certain amount, and thereafter automatically moved further without having to continue to open the door manually, for then simultaneously pushing the film cassette out of said chamber and further opening the door without manual intervention.

* * * * *